US006146485A

United States Patent [19]

Iacono et al.

[11] Patent Number: 6,146,485
[45] Date of Patent: *Nov. 14, 2000

[54] METHOD FOR MAKING A DECORATIVE FILM WITH HOT MELT ADHESIVE LAYER

[75] Inventors: Charles A. Iacono, Delran; Robert E. Miller, Barrington, both of N.J.; Werner Adel, Rosstal, Germany

[73] Assignee: Leonhard Kurz GmbH & Co., Furth, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/996,506

[22] Filed: Dec. 23, 1997

Related U.S. Application Data

[63] Continuation-in-part of application No. 08/791,303, Jan. 30, 1997, Pat. No. 5,981,009.

[51] Int. Cl.[7] .......................... B44C 1/165; B32B 31/30; B41M 3/12; B05D 5/10

[52] U.S. Cl. .......................... 156/230; 156/238; 156/240; 156/242; 156/247; 156/289; 156/498; 427/146; 427/148; 427/208.2; 118/271; 428/914

[58] Field of Search .................................... 156/230, 233, 156/234, 235, 237, 238, 239, 240, 241, 247, 277, 289, 498, 242; 427/207.1, 208.2, 208.4, 146, 148; 118/271, 59, 101; 428/914

[56] References Cited

U.S. PATENT DOCUMENTS

| | | | |
|---|---|---|---|
| 3,353,987 | 11/1967 | Manaka et al. | 117/47 |
| 3,379,561 | 4/1968 | Manaka | 117/122 |
| 3,449,280 | 6/1969 | Frigstad | 260/29.2 |
| 3,684,564 | 8/1972 | Lefrancois | 117/122 |
| 3,916,046 | 10/1975 | Youngberg | 428/31 |
| 4,012,552 | 3/1977 | Watts | 428/206 |
| 4,292,104 | 9/1981 | Heimbach et al. | 156/235 |
| 4,388,349 | 6/1983 | Korpman et al. | 427/208.4 |
| 4,427,733 | 1/1984 | Pöll et al. | 428/200 |
| 4,520,049 | 5/1985 | Nakanishi | 427/356 |
| 4,719,261 | 1/1988 | Bunnelle et al. | 525/97 |
| 4,868,012 | 9/1989 | Demoulin | 427/208.2 |
| 4,935,300 | 6/1990 | Parker | 428/352 |
| 5,395,690 | 3/1995 | Kawahata et al. | 428/355 |
| 5,503,905 | 4/1996 | Boris | 428/195 |
| B1 3,449,280 | 10/1983 | Frigstad | 523/402 |

FOREIGN PATENT DOCUMENTS

| | | |
|---|---|---|
| 2200332 | 3/1996 | Canada . |
| 0 059 276 A1 | 9/1982 | European Pat. Off. . |
| 0 230 364 A2 | 7/1987 | European Pat. Off. . |
| 94 04 567 U | 6/1994 | Germany . |
| WO 96/09174 | 3/1996 | Germany . |
| 44 46 255 A1 | 6/1996 | Germany . |

OTHER PUBLICATIONS

Skeist, I., ed. Handbook of Adhesives: 3rd. ed., Chapman and Hall., pp. 478–488, 556–561, 1990.

PCT International Search Report in counterpart International Application No. PCT/US 98/00645 from EPO, mailed Jun. 12, 1998 (5 pages).

*Primary Examiner*—James Sells
*Assistant Examiner*—J. A. Lorengo
*Attorney, Agent, or Firm*—Akin, Gump, Strauss, Hauer & Feld, L.L.P.

[57] ABSTRACT

In a method of making such a decorative film, a thermoplastic adhesive formulation is heated to a temperature in excess of the softening temperature of the thermoplastic in the formulation to form a molten adhesive formulation, which is then applied to a decorative layer on the carrier sheet thereby forming a transfer layer having a transfer surface and the transfer layer and carrier sheet form the decorative film. The decorative film is then chilled.

16 Claims, 2 Drawing Sheets

METHOD FOR MAKING A DECORATIVE FILM WITH HOT MELT ADHESIVE LAYER

CONTINUING INFORMATION

This application is a CIP of U.S. Ser. No. 08/791,303 filed Jan. 30, 1997, now U.S. Pat. No. 5,981,009.

BACKGROUND OF THE INVENTION

Simulated decorative transfer films and foils are used for providing a decorative pattern, for example, the appearance of real wood grain, to many substrates including furniture, countertops, walls, siding and automobiles. The typical method for applying such films and foils to a substrate includes use of a pressure-sensitive adhesive. However, such adhesives are sensitive with respect to placement and, if not positioned accurately, provide a poor fit and an irregular surface.

Heat-activatable adhesives have been used as substitutes for pressure-sensitive adhesives. However, in many instances, little or no adhesion is achieved between the substrate and the transfer layer. Further, in order to activate the adhesive, the film must be heated to a temperature in excess of the softening temperature of the film or foil thereby resulting in distortion or loss of the three-dimensional design or in shrinkage of the carrier sheet supporting the foil which also causes distortion. Such adhesive layers are generally applied by roller application using a solvent based system which includes the adhesive as a solid component in the solution. The solvent must then be volatilized leaving the adhesive layer on the film.

Further, such adhesive formulations include a large amount of solvent and contribute substantially to the overall amount of solvent used to form the films. High quantities of solvent pose environmental and manufacturing problems. In addition to the potential environmental and health hazards which result from solvent use, and the expense of disposal and environmental compliance, solvent-based coatings also increase manufacturing cost due to long drying times necessary for solvent evaporation. Substitution of water-based coatings which may reduce environmental concerns, still require long drying times. Further, such coatings exhibit poor Theological properties which manifest as orange peeling and non-uniform film thickness. Therefore, there is a need in the art for a solvent-free adhesive system which would reduce the overall amount of solvent used in manufacture of decorative films and eliminate oven drying time and which also provides a uniform and smooth film.

There is a need in the art for a uniform, easy-to-apply, solvent-free, heat-activatable adhesive layer which can be activated without harming the design layer of the decorative foil or film, which reduces the environmental impact resulting from the use of solvents and which eliminates oven drying time. There is also a need in the art for a method of applying a heat-activatable adhesive layer to a decorative foil or film which does not harm the decorative design, which does not shrink the carrier sheet supporting the decorative layers which would otherwise cause distortion, which sets quickly without use of oven drying and allows for a uniform, permanently bonded foil upon application to the substrate.

BRIEF SUMMARY OF THE INVENTION

The present invention includes a decorative film having a heat-activatable transfer layer for affixation to a substrate to be decorated. The film comprises a carrier sheet and a transfer layer in contact with the carrier sheet. The transfer layer comprises a decorative layer and a heat-activatable adhesive layer for affixing the film to a substrate, the decorative layer being situated between the carrier sheet and the heat-activatable adhesive layer, wherein the heat-activatable adhesive layer is a solidified layer of a molten adhesive formulation.

A method of making a decorative film having a heat-activatable transfer layer for affixation to a substrate to be decorated is also included in the present invention. A carrier sheet having a decorative layer applied to a first surface of the carrier sheet is provided. A thermoplastic adhesive formulation is heated to a temperature in excess of a softening temperature of a thermoplastic in the formulation such that the adhesive formulation is molten. A layer of the molten thermoplastic adhesive formulation is applied on the decorative layer thereby forming a transfer layer on top of the carrier sheet, wherein the transfer layer comprises the decorative layer and the layer of the adhesive formulation. The transfer layer and the carrier sheet form a decorative film. The transfer layer has a transfer surface for affixation to a substrate. The decorative film is then chilled.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings, like numerals are used to indicate like elements throughout. In the drawings.

DETAILED DESCRIPTION OF THE INVENTION

Figure 1:
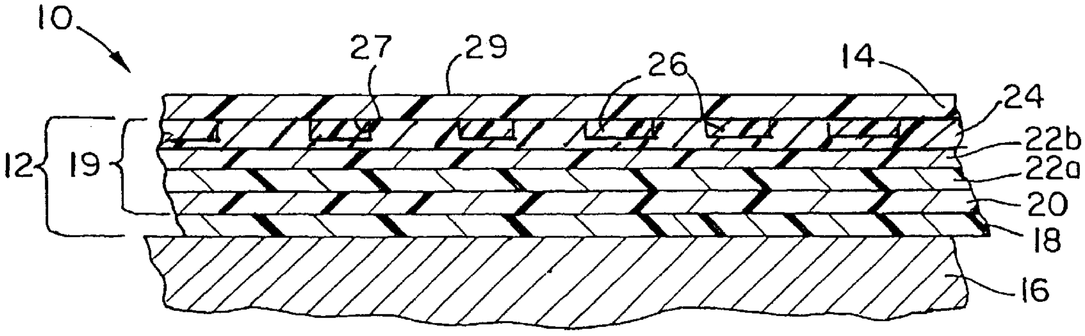
FIG. 1 is a schematic representation of a cross section of a decorative film according to a preferred embodiment of the present invention applied to a substrate and before removal of the carrier sheet.

Certain terminology is used in the following description for convenience only and is not limiting. The words "lower" and "upper" and "top" and "bottom" designate directions in the drawings to which reference is made. The terminology includes the words above specifically mentioned, derivatives thereof and words of similar import.

The present invention relates to heat-activatable decorative transfer films having a hot melt adhesive layer and a method of making the same.

As shown in FIG. 1, the film 10 according to the present invention comprises a transfer layer 12 and a removable carrier sheet 14. The film 10 is manufactured by applying individual layers thereof with a gravure-head or other roller to the carrier sheet 14 in order to create a pattern or design. The carrier sheet 14 is the base of the film from a manufacturing perspective. The transfer layer 12 may be applied to the carrier 14 in several consecutive layers. When applying the film 10 to a substrate 16, the transfer layer 12 is placed in facing engagement with the substrate 16. The transfer layer 12 serves as the main body of the film 10. The transfer layer 12 is affixable to a substrate 16 by the application of heat to the carrier sheet 14 due to the heat-activatable adhesive layer 18 within the transfer layer 12. Pressure may also be applied, in addition to heat, in affixing the film 10 to a substrate 16, but is not necessary. Use of heat and pressure is known to those skilled in the art as hot-stamping. Other suitable heat-transfer processes may also be used for affixing the film 10 to the substrate 16.

The transfer layer 12 includes the adhesive layer 18, which is described in detail below, and a decorative layer 19. The decorative layer 19 is typically made up of several layers which create a color or pattern for the film 10. However, the film 10 may also be opaque.

The top of the decorative layer 19, when the film 10 is applied to the substrate, may include a protective coating 24 which protects the remaining layers of the transfer layer 12. After the transfer layer 12 is affixed to the substrate 16 by the adhesive layer 18, the carrier sheet 14 is typically removed leaving the transfer layer 12 on top of, and bonded to the substrate 16. The protective coating 24, in addition to protecting the individual layers of the transfer layer 12 from damage, may also function to facilitate removal of the carrier sheet 16 from the transfer layer 12, and is therefore sometimes referred to as a protective release layer or release coat 24.

As shown in FIG. 1, the transfer layer 12 is made up of several individual layers and will be described from the bottom layer shown in FIG. 1 (i.e. the last layer which is applied to the top of the transfer layer during manufacturing). The adhesive layer 18, which functions to affix the film 10 to the substrate 16 is a heat-activatable adhesive layer 18. The decorative layer 19, which is situated in the transfer layer 12 between the carrier sheet 14 and the adhesive layer 18, may include a base coat 20, one or more print layers 22*a*, 22*b*, the protective coating 24 and an optional tick, or marking, layer 26.

The base coat 20 may be provided on top of the adhesive layer 18 to provide a base color to the film 10. A pattern, such as a wood grain pattern, for example, may be created by providing, preferably in contact with the base coat 20, at least one, and preferably several print layers 22*a*, 22*b*. As shown in FIG. 1, the print layers 22*a*, 22*b* are situated on top of the base coat 20.

As described above, a protective coating 24 may be provided in contact with the top-most print layer 22*b*. Preferably, the protective coating 24 is situated between the print layers 22*a*, 22*b* and the carrier sheet 14. The protective coating 24 is preferably adhered to the top of the print layers 22*a*, 22*b*, to thereby shield the lower layers of the film 10 from impact and other surface damage and to protect the integrity of the base coat 20 and print layers 22*a*, 22*b*.

In addition to the base coat 20, print layers 22*a*, 22*b* and protective coating 24, the decorative layer 19 of the transfer layer 12, may include an optional patterned marking layer 26, such as a tick layer of a wood grain pattern. As shown in the preferred embodiment of FIG. 1, such a patterned marking layer 26 may be provided to the decorative layer 19 and situated between the protective coating 24 and the carrier sheet 14 as described in U.S. Pat. No. 5,503,905, incorporated herein by reference. Alternatively, the patterned marking layer 26 may be situated between the protective coating 24 and the topmost print layer 22*b* (not shown). The patterned marking layer 26 may have a formulation as described in U.S. Pat. No. 5,503,905, or in accordance with other such marking layers used for making simulated wood-grain or other patterned films.

It should be understood, based on this disclosure, that the transfer layer 12 of the film 10 need not be provided with the layers described in the order shown, and may be rearranged or layers may be omitted, with the exception of the adhesive layer 18 and at least one other layer, with or without color provided, depending upon the particular pattern to be formed, or the intended use of the film. For example, the adhesive layer 18 may or may not be provided with a color as described further below, and the film 10 may be formed by using only an adhesive layer 18, a clear protective coating 24 and a carrier sheet 14. Many alternative designs can be achieved, and the film should not be considered as limited to the arrangement shown.

The adhesive layer is preferably a solidified layer of a molten adhesive formulation. The molten adhesive formulation preferably includes a thermoplastic, more preferably, a polyamide copolymer, a polyester, an ethylene vinyl acetate, a polycaprolactone, a copolymer of ethylene vinyl acetate and polycaprolactone, and similar polymers and blends of polymers. Most preferably, the thermoplastic is a polyamide copolymer. In addition, the formulation preferably comprises a filler in addition to the thermoplastic. The filler is preferably a pigment or an extender. Pigments can be selected to provide color and to adjust the properties of the film adhesive layer as discussed below. Extenders are most preferred as an economic alternative to pigments which allow for a clear adhesive layer and still provide the ability to adjust the adhesive layer properties. Preferred pigments may be any suitable organic or inorganic pigment. Preferred organic pigments include phthalocyanine blue, diazo condensation pigments, and similar pigments. Preferred inorganic pigments include titanium dioxide, iron oxide, and similar pigments. Preferred extenders include calcium carbonate, hydrated alumina, amorphous silica and similar compounds.

The filler is preferably present in an amount of from about 0.1 to about 99%, more preferably from about 2 to about 40%, and optimally from about 5 to about 35% by weight of the formulation. The filler amount is adjusted for particular formulations such that the adhesive layer 18 is applied evenly and the film 10 does not wrinkle or grip during winding, and has sufficient slip, on the final take-up roll as described below. The filler may be omitted in certain applications. However, it is preferred that some filler, preferably at least an extender, is used. Further, filler levels may be increased or decreased to adjust the level of tackiness of the adhesive formulation.

While other similar thermoplastics having similar properties may be used, it is preferred according to the present invention that the thermoplastic be a random polyamide copolymer.

In general, the preferred thermoplastic has a softening point (Ring & Ball) of from about 110° C. to about 160° C., more preferably from about 125° C. to about 150° C. particularly if a polyamide copolymer is used. The average molecular weight of the thermoplastic should be preferably from about 20,000 to about 50,000, and more preferably from about 20,000 to about 35,000. If a polyamide copolymer is used, the molecular weight is preferably from about 20,000 to about 25,000. The Brookfield viscosity at 190° C. is preferably from about 1,000 to about 5,000 cps, and more preferably from about 2,000 to about 3,500. If a polyamide copolymer is used, the Brookfield viscosity at 190° C. is preferably 2,800 to about 4,800 cps, more preferably from about 3,325 to about 3,800 cps. Such polyamide copolymers preferably have a solubility in water of <0.1% at 25° C., and a specific gravity of 0.97 at 25° C. Suitable thermoplastics may be synthesized or manufactured for use in the present invention, provided they meet the physical properties described herein. The thermoplastic is preferably present in an amount of from about 1 to about 99.9%, and more preferably from about 60 to about 98% by weight of the formulation.

In the adhesive formulation, the amount of filler loading is used to control the level of tackiness in the adhesive layer and/or to provide an additional color to the base of the design. For example, if a pigment is used as the filler, the filler may also be a white or black pigment, instead of a base color pigment. Further, a clear extender filler may be used. In view of the ability of the adhesive layer 18 to provide color by use of a pigment filler, a base coat 20 may be omitted. Similarly, as the base coat 20 may provide color, if a pigment is unnecessary in a particular application, then the pigment may be omitted. However, a base coat 20, may be used for additional opacity or bulk for adhesion purposes in some film applications. In addition, for example, a clear film may be formed using an extender-containing adhesive layer, a clear protective layer as the design layer and a carrier. Many variations are possible and the particular filler selection and/or base coat selection should not be considered limited.

The base coat 20, which functions primarily to provide a base color to the film 10, is shown in FIG. 1 on top of the heat-activatable adhesive layer 18. The base coat 20 may include organic and inorganic pigments, solvent and resins, for example, acrylic resins, vinyl resins and mixtures thereof. During the curing, i.e., film drying, the organic solvent is substantially removed by evaporation due to the application of heat. The resins may be any suitable resins which are capable of bonding to the adhesive layer 18 and optionally capable of cross-linking to provide a protective base for the film 10. Preferably, the solvent comprises from about 50% to about 70% by weight of the base coat formulation prior to drying. The resin or resin mixture preferably comprises from about 50% to about 90% by weight of the base coat, on a solids basis. The pigments comprise from about 10% to about 50% by weight of the base coat 20 on a solids basis. The base coat 20 may be omitted from the film 10 without departing from the present invention if a thinner, less opaque or even transparent film 10 is desired for a particular application.

The particular pigments and resins used in the base coat 20 are dependent upon the substrate 16 to which the film is to be affixed and the base color selected for the particular pattern to be provided by the film 10. It is understood by those skilled in the art that selection of such a base coat pigment varies with the desired pattern. Suitable pigments which may be used in the base coat 20 of the present film 10 may be organic or inorganic pigments and include, for example, titanium dioxide, silica, iron oxides, talc, mica, clay, zinc oxide, carbon black, lead chromate, metallic pigments, molybdate orange, calcium carbonate, barium sulfate, phthalocyanines and quinacrynone red.

In the preferred embodiment shown in FIG. 1 at least one print layer 22*a*, 22*b* is adhered to the top of the base coat 20. The print layers are depicted for the purpose of clarity and ease of illustration as solid layers. It will be understood by those skilled in the art that such layers 22*a*, 22*b* may be only partial in nature as a result of the method of application in a layered pattern. The print layers 22*a*, 22*b* may comprise various inks or other printing materials and are generally applied by a series of gravure rollers. The gravure rollers help to impart a pattern to the film 10 by applying varying shades of print in a layered and/or registered manner. Generally, from about 1 to about 5 such print layers 22*a*, 22*b* are provided.

It will be understood by one skilled in the art, based on this disclosure, that a solid colored film or a clear film may be made without the use of print layers 22*a*, 22*b*. The print layers 22*a*, 22*b* primarily function to provide the appearance desired by the individual practicing the invention. Further, an altered pattern or film appearance having an optional, enhanced marking layer such as a tick layer may also be included within the scope of the invention.

The protective coating 24 which may also serve as a release layer is adhered to the top of the print layers 22*a*, 22*b*. The protective coating 24 may include a lacquer-based coating which may be derived from either thermosetting or, preferably thermoplastic resins. The protective coating 24 may include one or more non-reactive resins. The non-reactive resins would include those thermoplastic resins lacking in reactive functionality. Preferably, the protective coating 24 is a clear thermoplastic lacquer such as a non-reactive acrylic or vinyl resin or a mixture of these resins. It will be understood by those skilled in the art that other non-reactive thermoplastics may be substituted for or combined with these resins.

The substrate 16 may be any substrate surface capable of bonding to the film 10 of the present invention. Typical substrates 16 include, among others, wood, plastics, metal, paper and similar substrates. Preferably, a wood or a wood-type substrate such as veneer, natural wood, medium-density fiberboard, or particle board, is used due to enhanced bonding with the adhesive layer 18 of the present invention.

A preferred embodiment of the method of making a decorative film having a heat-activatable transfer layer for affixation to a surface will now be described. Initially, a carrier sheet 14 having a decorative layer 19 applied to a first surface 27 of the carrier sheet 14 is provided. The first surface 27 is preferably the matte surface of the carrier sheet 14 which is selected to receive the decorative layer 19 of the transfer layer 12. The carrier sheet 14 and decorative layer 19 would be as shown in the film 10 of FIG. 1, with the exception of the substrate 16 and the adhesive layer 18. As shown in FIG. 1, the first surface 27 of the carrier sheet 14 is the lower surface of the carrier sheet 14 in contact with the decorative layer 19.

The decorative layer 19 is manufactured on the carrier sheet 14 in accordance with any suitable method, for example the method as described in U.S. Pat. No. 5,503,905, and may be wound-up on a take-up roll with the second (top surface in FIG. 1) surface 29 of the carrier sheet, which is opposite the first surface 27 on the outer surface of the roll. The adhesive layer is not yet applied to the film at this stage of the method.

According to the method of the invention, the decorative layer may be manufactured separately, and then loaded on an apparatus such as that shown in FIG. 2, as described in detail below. Alternatively, an apparatus such as that shown in FIG. 2 may be incorporated as a part of a film manufacturing apparatus such that the decorative film and adhesive layer may be formed in a continuous in-line film-manufacturing process. Such an process would include a standard gravure-type or other rotating film-forming apparatus as generally used in the art (not shown) in combination and in-line with an adhesive application apparatus such as that shown in FIG. 2.

Figure 2:
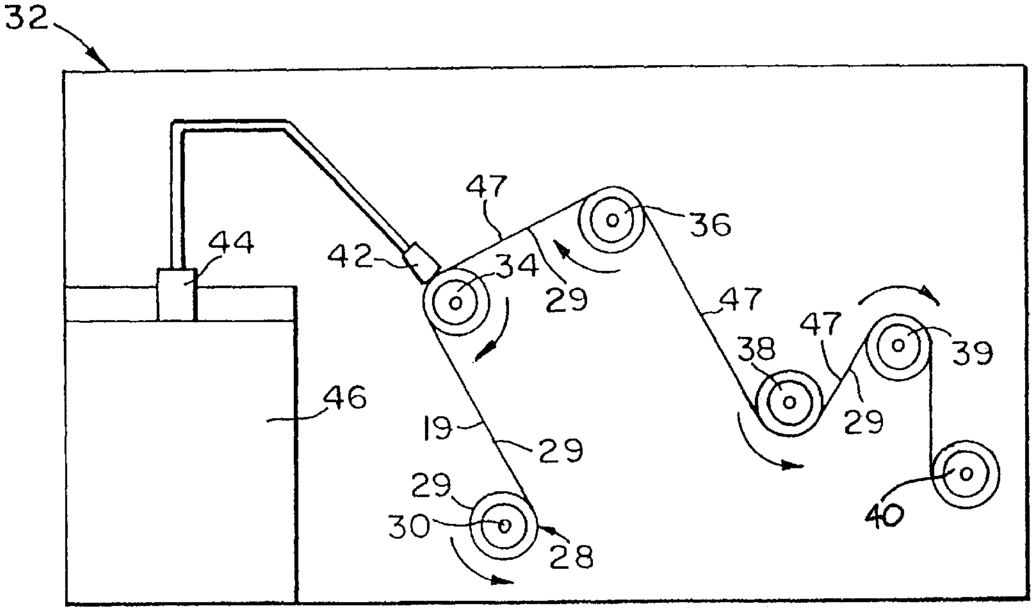
FIG. 2 is a schematic representation of one embodiment of a method of making a decorative film according to a preferred embodiment of the present invention.

In the preferred method as shown in FIG. 2, the carrier sheet 14 having the decorative layer 19 applied thereto, in roll form, generally designated as 28 is mounted on a rotating chuck 30 capable of operating at a constant line speed of from about 30 to about 366 m/min, preferably from about 90 to about 213 m/min. The carrier sheet 14 with decorative layer 19 is taken from the roll 28 and threaded through the adhesive application apparatus 32 such that it passes over a backing roll 34 with the second surface 29 of the carrier sheet 14 in contact with the backing roll 34. The backing roll 34 may be chilled. The surface of the backing roll 34 is preferably formed of silicone rubber or chrome; however, other suitable substances may be used. The carrier sheet 14 with decorative layer 19 is then wound around a first chill roll 36 with the second surface 29 of the carrier sheet 14 in contact with the first chill roll 36. The carrier sheet 14 with decorative layer 19 is then preferably passed over a second chill roll 38 with the decorative layer 19 in contact with the second chill roll 38. The carrier sheet 14 with decorative layer 19 is then passed over a spreader roll 39, or other similar tension control device, for example, a festoon accumulator, dancer roll, banana roll, or adjustable tension idler, and finally wound around and fastened to a take-up roll 40.

Once the carrier sheet 14 with decorative layer 19 is wound on the apparatus 32, the motorized rolls are engaged and the line speed adjusted in the range described above. In a continuous film forming process, for example, the carrier film could be wound through the entire film forming apparatus including the apparatus of FIG. 2. In this case, the line speed would be adjusted for forming the individual layers of the decorative layer as well as for applying the adhesive layer.

An applicator head 42 in communication with the outlet 44 of a melt chamber 46 is then placed in contact with the outermost surface of the decorative layer 19 as it passes over the backing roll 34. The melt chamber 46 may be any suitable melt chamber, for example, an extruder, a melter and gear or piston pump, a drum unloader, or a heat-gradient melting tank. Preferably, the melt chamber 46 is an extruder. The adhesive applicator head 42 is preferably configured to extend across the width of the carrier sheet and decorative layer 19 and provide a smooth even layer of the molten adhesive from the melt chamber 46.

The adhesive formulation, preferably the adhesive formulation described above for the decorative film 10, is initially introduced into the melt chamber 46. The melt chamber 46 is heated until the formulation reaches a temperature in excess of the softening point of the thermoplastic in the adhesive formulation. Preferably, the formulation is heated to a temperature of from about 160° C. to about 250° C., and in excess of the softening point which may be from about 110° C. to about 160° C., to achieve a molten adhesive formulation which flows readily with a preferred viscosity in the range of from about 1000 cps to about 4000 cps.

When initially operating the apparatus 32, the line speed and/or feed rate may have to be adjusted upward or downward depending upon the particular adhesive formulation being used in order to achieve a proper coating thickness. Preferably, the molten adhesive is applied such that the resulting layer of the adhesive formulation is from about 10 to about 60 $g/m^2$, and preferably from about 16 to about 25 $g/m^2$. Depending upon the viscosity of the adhesive formulation and/or the temperature of the melt chamber 46, the line speed may have to be adjusted to provide the preferred coating weight and thickness. Alternatively, for a given line speed, the temperature of the melt chamber or the mass feed rate of the molten formulation could be varied to provide the preferred coating thickness for a particular application. Such adjustments will depend to a large extent on the type of thermoplastic.

Once the layer of the molten thermoplastic adhesive formulation is applied to the decorative layer, the transfer layer 12 is thereby formed on the carrier sheet 14. The transfer layer 12 includes the decorative layer 19 and the layer 18 of the adhesive formulation. The outermost transfer surface 47 of the transfer layer 12, is also the surface of the adhesive layer 18 and is intended for affixing the film to a substrate surface.

As the carrier sheet 14 with transfer layer 12 leaves the applicator 42, it is contacted with and passes over the first chill roll 36 to "back chill" the second surface 29 of the carrier sheet 14 opposite the first surface 27 of the carrier sheet 14. The transfer surface 47 is then preferably contacted with and passes over the second chill roll 38. The second chill roll 38, while preferred, is optional. In the absence of the second chill roll, the size and corresponding surface contact area of the first chill roll 36 can be increased to provide sufficient cooling surface area to solidify the adhesive layer. If a second chill roll 38 is used, as shown in FIG. 2, instead of a single, large chill roll 36, the second chill roll 38, can function to chill either the adhesive surface of the transfer layer 12, as shown, or to further cool the film by contacting the second surface 29 of the carrier sheet 14. Preferably, the second chill roll 38 is used to chill the adhesive surface of the transfer layer and to thereby solidify the adhesive layer 18 and form the decorative film 10. A flow of heat transfer fluid, for example, cooling water, is circulated through interior chambers within the first and second chill rolls 36, 38 to maintain the surface of the first and second chill rolls at a temperature of from about 4° C. to about 27° C., preferably from about 10° C. to about 25° C. Preferably, the chill rolls 36, 38 are formed of a material having sufficient thermal conductivity to cool and solidify the adhesive formulation as the carrier sheet 14 with transfer layer 12 is passed over the rolls to form the film 10. Most preferably, the chill rolls 36, 38 have a stainless steel or another similar metallic surface.

The final film 10 having the solidified adhesive layer is wound up on the take-up roll 40.

Figure 3:
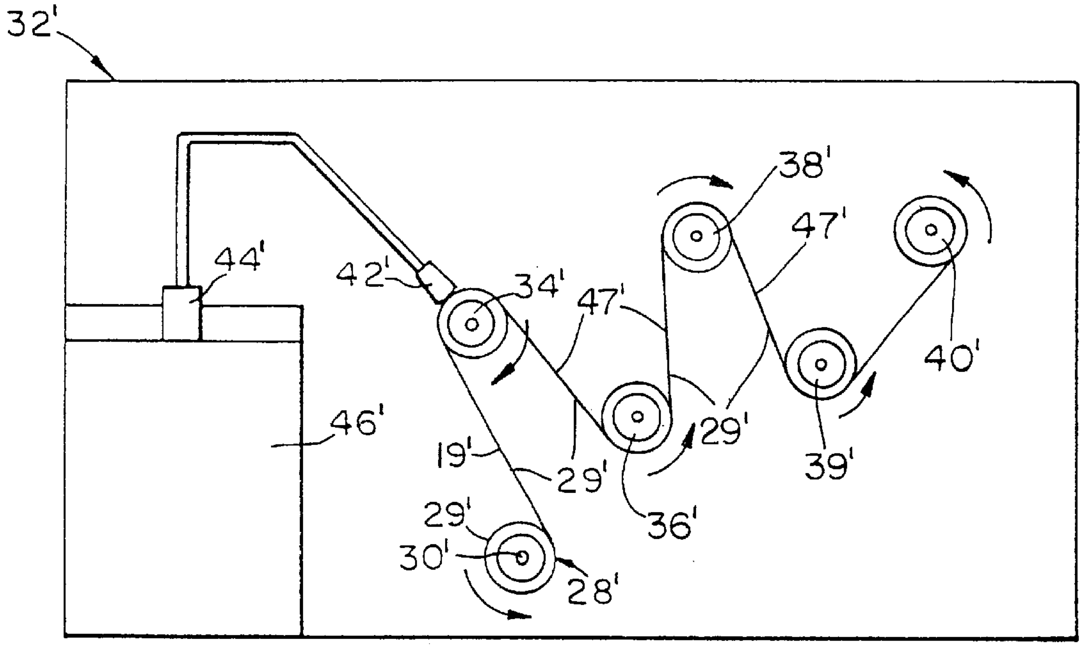
FIG. 3 is a schematic representation of another embodiment of a method of making a decorative film according to a preferred embodiment of the present invention.

In an alternative embodiment of the method as shown in FIG. 3, the decorative film 19' and carrier sheet 14' are prepared as described above with respect to the decorative film 19 and carrier sheet 14 and are in all respects the same. Similarly, all other elements shown or described with respect to FIG. 3 are the same as those of FIG. 2 of the corresponding reference number. In the alternative embodiment of the method, the chilling of the finished film is done in an alternative manner. After the carrier sheet 14' and decorative layer 19' are prepared, they are wound around a first chill roll 36' with the second surface 29' of the carrier sheet 14' being opposite the first chill roll 36', such that the surface of the decorative layer 19' is in contact with the first chill roll 36'. The carrier sheet 14' with decorative layer 19' is then preferably passed over a second chill roll 38' with the second surface 29' of the carrier sheet 14' in contact with the second chill roll 38'. The carrier sheet 14' with decorative layer 19' is then passed over a spreader roll 39', or other similar tension control device as described above and fastened to a take-up roll 40'.

Once the carrier sheet 14' with decorative layer 19' is wound on the apparatus 32', the motorized rolls are engaged and the line speed adjusted in the range described above with respect to the first embodiment of the method of the invention.

An applicator head 42' in communication with the outlet 44' of a melt chamber 46' is then placed in contact with the outermost surface of the decorative layer 19' as it passes over the backing roll 34'. The melt chamber 46' and associated components of the apparatus 32' are the same as apparatus 32 and are as described above. The adhesive formulation, preferably the adhesive formulation described above for the decorative film 10, is initially introduced into the melt chamber 46' and the melt chamber heated in the manner described above.

When initially operating the apparatus 32', the line speed and/or feed rate may have to be adjusted as noted above with respect to the first embodiment of the method of the invention. Once the layer of the molten thermoplastic adhesive formulation is applied to the decorative layer, the transfer layer 12' is thereby formed on the carrier sheet 14'. The transfer layer 12' includes the decorative layer 19' and the layer 18' of the adhesive formulation. The outermost transfer surface 47' of the transfer layer 12', is also the surface of the adhesive layer 18' and is intended for affixing the film to a substrate surface.

As the carrier sheet 14' with transfer layer 12' leaves the applicator 42', it is contacted with and passes over the first chill roll 36' to chill the transfer surface 47' or "face chill." The second surface 29' of the carrier sheet 14' opposite the first surface 27' of the carrier sheet 14' is then preferably contacted with and passes over the second chill roll 38' to "back chill" the decorative film. The second chill roll 38', while preferred, is optional. In the absence of the second chill roll, the size and corresponding surface contact area of the first chill roll 36' can be increased to provide sufficient cooling surface area to solidify the adhesive layer. If a second chill roll 38' is used, as shown in FIG. 3, instead of a single, large chill roll 36', the second chill roll 38', can function to chill either the second surface 29' of the carrier sheet 14' opposite the first surface 27' of the carrier sheet 14', as shown, or to further cool the film by contacting the transfer surface 47'. Preferably, in the alternative embodiment shown in FIG. 3, the second chill roll 38' is used to chill the of the transfer layer 47' and to thereby solidify the adhesive layer 18' and form the decorative film. A flow of heat transfer fluid, for example, cooling water, is preferably circulated through interior chambers within the first and second chill rolls 36', 38' in the same manner as described above in the first embodiment of the method of the invention and the chill rolls 36', 38' are made of the materials described above. The final film having the solidified adhesive layer is wound up on the take-up roll 40'.

The invention, with respect to the film and method of making the film will now be described in more detail with respect to the following specific, non-limiting example:

EXAMPLE 1

A decorative layer having a decorative pattern is prepared on a carrier sheet as described below. The carrier sheet is formed of polyester having a matte gloss level. A protective coating formulation is prepared and contains the ingredients in the weight percentages listed in Table 1. The formulation is prepared by mixing all of the components in the weight percentages listed in Table 1.

TABLE 1

| Protective Coating Components | Weight Percentage (%) |
|---|---|
| Methylethylketone | 26 |
| Polymethylmethacrylate (non-reactive acrylic) (Tg = 105° C.) (Specific Gravity = 1.17) | 37 |
| Polyethylene Wax (23% Oxygen) (Melting Point = 140° C.) | 11 |
| Toluol | 26 |

The protective coating formulation is applied by gravure roller to the carrier sheet and cured. Print layers providing the decorative pattern are applied to the protective coating by gravure rollers and cured. The composition of the print layers is shown in Table 2.

TABLE 2

| Decorative Print Component | Weight Percentage (%) |
|---|---|
| Toluol | 37.8 |
| Methylisobutylketone | 37.8 |
| Butyl acetate | 8.4 |
| Polyvinyl Chloride Terpolymer (Tg = 72° C.) (Specific Gravity = 1.35) | 13.4 |
| Carbon Black | 2.6 |

A base coat having the components shown in Table 3 with the respective weight percentages is then applied to the print layer and cured in the same manner described above.

TABLE 3

| Base Coat Component | Weight Percentage (%) |
|---|---|
| Toluol | 28.9 |
| Butyl Acetate | 9.6 |
| Ethyl Alcohol | 0.5 |
| Anionic Wetting Agent | 0.5 |
| Polyester Adipate | 5.3 |
| Yellow Iron Oxide | 20.7 |
| Red Iron Oxide | 7.0 |
| Black Iron Oxide | 3.7 |
| Polymethylmethacrylate (30% in toluene and butanol) (Tg = 105° C.) | 22.6 |
| Polymethylmethacrylate (Tg = 86° C.) (Specific Gravity = 1.17) | 1.2 |

The film is wound on a roll and installed on an adhesive coating apparatus having the components as shown in FIG. 2. Prior to loading the roll of carrier sheet coated with the decorative layer on the apparatus, an extruder is loaded with a hot melt adhesive formulation comprising the components listed below in Table 4 in the weight percentages shown.

TABLE 4

| Adhesive Formulation Component | Weight Percentage (%) |
|---|---|
| Polyamide Copolymer (Ring & Ball softening point of 125° C.; | 90 |

TABLE 4-continued

| Adhesive Formulation Component | Weight Percentage (%) |
|---|---|
| melting point of 131° C.; viscosity at 190° C. of 3325 cps) | |
| Calcium Carbonate | 10 |

The formulation is heated to 204° C. which is in excess of the softening temperature of the polyamide copolymer. The average softening temperature for this polyamide is between 125–133° C. The formulation is molten for a period of 5 minutes to achieve a steady state prior to loading the roll of the carrier sheet having the decorative layer on the apparatus. The film is then threaded through the apparatus and the end of the film connected to a take-up roll. The apparatus is started and runs at a line speed of 91 m/min.

The applicator head has an opening slit of approximately 76.2 cm in width and is approximately 0.051 cm thick. The head is in communication with the extruder and is then placed proximate to the decorative layer with only a very slight gap as the decorative layer passes over the backing roll. The molten thermoplastic adhesive layer is applied to the decorative layer. The chill rolls are fed with water at a temperature of about 10° C. and the surface of the chill rolls maintained at an average temperature of 10° C. The adhesive layer when solidified has a thickness of 18 $g/m^2 \pm 2$ $g/m^2$.

The finished film is hot-stamped onto a wood substrate, and the carrier sheet is removed. The film exhibits a smooth surface and passes all requirements for Laminating Materials Hot-Stamp Foil Specifications.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for making a decorative film having a heat-activatable transfer layer for affixation to a substrate to be decorated, comprising:

(a) providing a carrier sheet having a decorative layer applied to a first surface of the carrier sheet;

(b) heating a heat-activatable thermoplastic adhesive formulation to a temperature in excess of a softening temperature of a thermoplastic in the formulation such that the adhesive formulation is molten;

(c) applying a layer of the molten thermoplastic adhesive formulation on the decorative layer thereby forming a heat-activatable transfer layer on top of the carrier sheet, wherein the transfer layer comprises the decorative layer and the layer of the adhesive formulation, the transfer layer having a transfer surface for affixation to a substrate and said transfer layer and said carrier sheet form a decorative film; and (d) chilling said decorative film such that the decorative film comprises a solidified layer of a molten adhesive formulation, wherein said molten adhesive formulation is solvent-free.

2. The method according to claim 1, wherein step (d) comprises chilling a second surface of the carrier sheet opposite the first surface of the carrier sheet.

3. The method according to claim 2, further comprising the step of:

(e) chilling the transfer surface.

4. The method according to claim 3, wherein step (d) comprises contacting the second surface of the carrier sheet with a first chill roll and step (e) comprises contacting the transfer surface with a second chill roll.

5. The method according to claim 4, further comprising providing a flow of heat transfer fluid to chambers within the first and second chill rolls to maintain the surface of the first and second chill rolls at a temperature of from about 4 to about 27° C.

6. The method according to claim 1, wherein step (d) further comprises chilling the transfer surface.

7. The method according to claim 6, further comprising the step of (e) chilling a second surface of the carrier sheet opposite the first surface of the carrier sheet.

8. The method according to claim 7, wherein step (d) comprises contacting the transfer layer with a first chill roll and step (e) comprises contacting the second surface of the carrier sheet with a second chill roll.

9. The method according to claim 8, further comprising providing a flow of heat transfer fluid to chambers within the first and second chill rolls to maintain the surface of the first and second chill rolls at a temperature of from about 4 to about 27° C.

10. The method according to claim 1, wherein the thermoplastic adhesive formulation comprises a polyamide copolymer.

11. The method according to claim 10, wherein the thermoplastic adhesive formulation further comprises a filler selected from the group consisting of pigments and extenders.

12. The method according to claim 11, wherein the thermoplastic adhesive formulation comprises from about 1 to about 99.9% by weight of the polyamide copolymer and from about 99 to about 0.1% by weight of the filler.

13. The method according to claim 10, wherein the softening temperature of the thermoplastic is from about 110° C. to about 160° C.

14. The method according to claim 13, wherein the thermoplastic adhesive formulation is heated in excess of the softening temperature to a temperature of from about 160° C. to about 250° C.

15. The method according to claim 1, wherein the layer of the adhesive formulation is present in an amount of from about 10 to about 60 $g/m^2$.

16. The method according to claim 1, further comprising applying the molten thermoplastic adhesive formulation to the decorative layer with an applicator in communication with a melt chamber, wherein the melt chamber is fed with the molten thermoplastic adhesive formulation.

* * * * *